US012602302B2

(12) United States Patent
Bahirat

(10) Patent No.: US 12,602,302 B2
(45) Date of Patent: Apr. 14, 2026

(54) MACHINE LEARNING MODEL TRAINING WITH HARDWARE ERROR SIMULATION

(71) Applicant: Google LLC, Mountain View, CA (US)

(72) Inventor: Shirish Bahirat, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/804,236

(22) Filed: Aug. 14, 2024

(65) Prior Publication Data

US 2026/0050526 A1 Feb. 19, 2026

(51) Int. Cl.
*G06F 11/00* (2006.01)
*G06F 11/26* (2006.01)
*G06N 3/0985* (2023.01)

(52) U.S. Cl.
CPC ......... *G06F 11/261* (2013.01); *G06N 3/0985* (2023.01)

(58) Field of Classification Search
CPC ............................ G06F 11/261; G06N 3/0985
See application file for complete search history.

(56) References Cited

U.S. PATENT DOCUMENTS

| | | | |
|---|---|---|---|
| 11,669,390 B2 * | 6/2023 | Rathinasabapathy | ........................ G06F 11/0781 714/4.1 |
| 2024/0273373 A1 * | 8/2024 | Chang | .................... G06N 3/084 |
| 2025/0291689 A1 * | 9/2025 | Srinivasan | ............ G06F 11/261 |

OTHER PUBLICATIONS

Ahmadilivani, Mohammad, et al.s., A Systematic Literature Review on Hardware Reliabiilty Assessment Methods for Deep Neural Networks, ACM Computing Surveys, vol. 56, No. 6, Article 141, Jan. 2024, 39 pages.
Zahid, Ussama, et al.s., FAT: Training Neural Networks for Reliable Inference Under Hardware Faults, arXiv:2011, Nov. 11, 2020, 11 pages.
Zhou, Zhi-Hua, et al., Evolving Fault-Tolerant Neural Networks, National Laboratory for novel Software Technology, Nanjing University, China, Jun. 2023, 7 pages.
Chen, Yuhao, et al.s., FTPipeHD: A Fault-Tolerant Pipeline-Parallel Distributed Training Framework for Heterogeneous Edge Devices, arXiv:2110.02781v1, Oct. 2021, 11 pages.
Huang, Haitong, et al.s, MRFI: An Open Source Multi-Resolution Fault Injection Framework for Neural Network Processing, arXIv:2306.11758v2, Jun. 2023, 9 pages.

(Continued)

*Primary Examiner* — Jason B Bryan
(74) *Attorney, Agent, or Firm* — Lerner David LLP

(57) ABSTRACT

Methods, systems, and apparatus, including computer-readable storage media for handling component error of datacenter infrastructure by training machine learning models to handle errors when the models are deployed. Rather than predict or mitigate errors in the hardware of a datacenter or another site deploying the machine learning model, the model is trained to perform a task with comparable accuracy and efficiency even when some hardware on which the model is deployed fails. Component error can instead be simulated during training to cause the machine learning model deployed on the infrastructure to learn to correct errors caused by the component errors. The model can continue to be trained to compensate for periods in which not all parts of the model are available at inference. Updates to the model can be backpropagated to correct errors for handling instances of component error.

20 Claims, 6 Drawing Sheets

200

Receive failure frequency data including a frequency and duration for component failure of a plurality of hardware components. — 210

Train a machine learning model over one or more training iterations to generate a trained machine learning model, wherein, during at least one training iterations, failure of one or more hardware components is simulated in accordance with the failure frequency data. — 220

Output the trained machine learning model. — 230

(56) References Cited

OTHER PUBLICATIONS

He, Tao, et al.s., Unicron: Economizing Self-Healing LLM Training At Scale, arXiv.2401.00134v1, Dec. 2023, 15 pages.

Gupta, Tanmaey, et al.s., Just-in-Time Checkpoint: Low Cost Error Recovery from Deep Learning Training Failures, EuroSys '24 Apr. 22-25, 2024, Athens, Greece, 16 pages.

Wu, Baodong, et al.s., Transom: An Efficient Fault-Tolerant System for Training LLMs, arXiv.2310.10046v3, Oct. 18, 2023, 14 pages.

Zhang, Tianyu, et al.s., Efficient Fault Tolerance for Recommendation Model Training via Erasure Coding, PVLDB Endowment, vol. 16, No. 11, Jun. 2021, 14 pages.

Kochhar, Deepak, et al.s., An Approach For Fault Tolerance In Cloud Computing Using Machine Learning Technique, International Journal of Pure and Applied Mathematics, vol. 117, No. 22, Nov. 2017, pp. 345-351.

Agarwal, Himanshu, A Comprehensive Survey of Fault Tolerance Techniques in Cloud Computing, Int'l Conf. on Computing and Network Communications, Trivandrum, India, Dec. 16-19, 2015, 6 pages.

Wang, Zhuang, et al.s., Gemini: Fast Failure Recovery in Distributed Training with In-Memory Checkpoints, ACM, Oct. 2023, 18 pages.

Taheri, Mahdi, et al.s, Saffira: a Framework for Assessing the Reliability of Systolic-Array Based DNN Accelerators, arXiv:2403.02946v1, Mar. 2024, 6 pages.

Colucci, Alessio, et al.s, enpheeph: A Fault Injection Framework for Spiking and Compressed Deep Neural Networks, arXiv.2208.00328v1, Jul. 2022, 8 pages.

Maeng, Kiwan, et al.s., CPR: Understanding and Improving Failure Tolernt Training for Deep Learning Recommendation with Partial Recovery, MLSys Conference, Aug. 2022, 15 pages.

Extended European Search Report for European Patent Application No. 251949954 dated Dec. 9, 2025. 10 pages.

Maeng et al. CPR: Understanding and Improving Failure Tolerant Training for Deep Learning Recommendation with Partial Recovery. arxiv.org, Cornell University Library, 201 Olin Library Cornell University Ithaca, NY 14853, Nov. 5, 2020 (Nov. 5, 2020), 15 pages.

Zeng et al. Benchmarking the Robustness of Temporal Action Detection Models Against Temporal Corruptions. arxiv.org, Cornell University Library, 201 Olin Library Cornell University Ithaca, NY 14853, Mar. 29, 2024 (Mar. 29, 2024), 16 pages.

Ziade et al. A Survey on Fault Injection Techniques. The International Arab Journal of Information Technology, Zarka Private University, Colleges of Computing And Information Technology, Jordan, vol. 1, No. 2, Jul. 1, 2004 (Jul. 1, 2004), pp. 171-186.

* cited by examiner

200

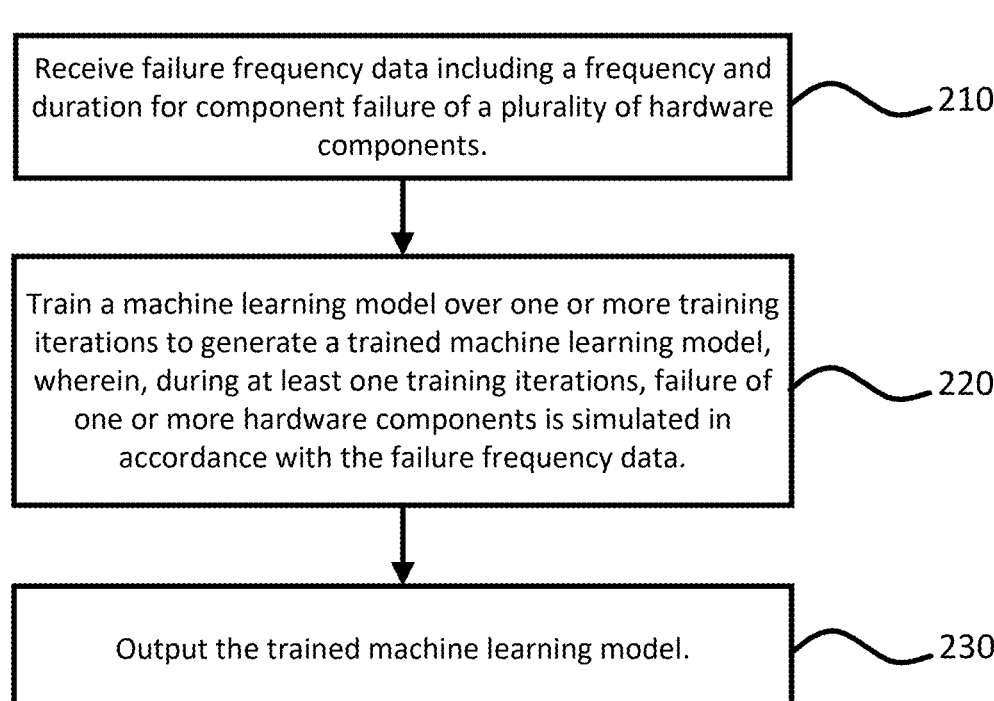

| Receive failure frequency data including a frequency and duration for component failure of a plurality of hardware components. | 210 |

| Train a machine learning model over one or more training iterations to generate a trained machine learning model, wherein, during at least one training iterations, failure of one or more hardware components is simulated in accordance with the failure frequency data. | 220 |

| Output the trained machine learning model. | 230 |

FIG. 2

300
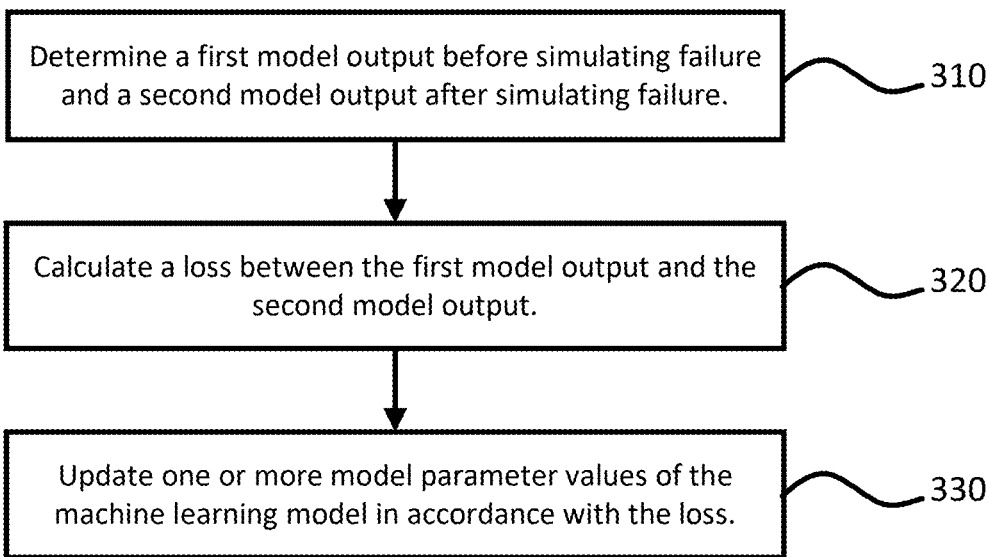
Determine a first model output before simulating failure and a second model output after simulating failure.          310
Calculate a loss between the first model output and the second model output.          320
Update one or more model parameter values of the machine learning model in accordance with the loss.          330
FIG. 3

400
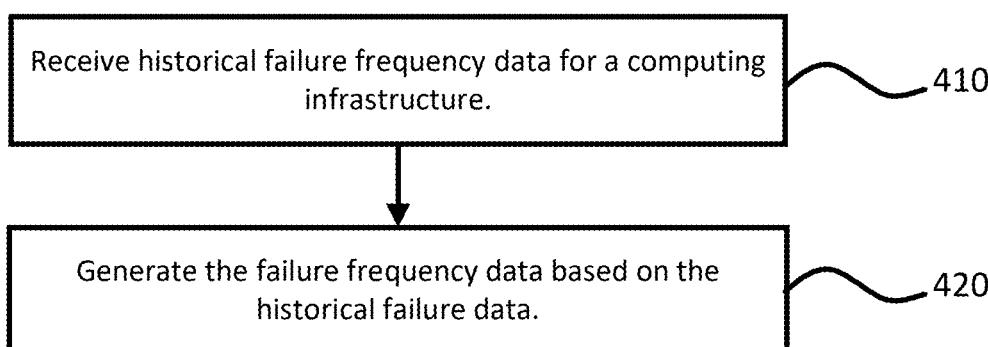
Receive historical failure frequency data for a computing infrastructure.     410
Generate the failure frequency data based on the historical failure data.     420
FIG. 4

MACHINE LEARNING MODEL TRAINING WITH HARDWARE ERROR SIMULATION

BACKGROUND

Machine learning models, such as foundation models used to power applications to generate images, text, videos, etc., are trained and executed in datacenters. Datacenter infrastructure includes multiple hardware components, for example processors, storage devices, network devices, working in parallel to train increasingly larger and more complex models. Hardware components in these datacenters can fail or be temporarily inaccessible for a number of reasons, including due to network connectivity errors, memory errors, or computation errors.

Different approaches exist to account for hardware component errors during training or execution of a machine learning model, including on-coming error prediction, built-in redundancies, or checkpoint creation. For example, on-coming error prediction involves preemptively beginning processes to reduce downtime as a result of an error. However, on-coming error prediction may not always accurately predict error. As another example, built-in redundancies include having extra components that can be swapped with failed components to mitigate, but not eliminate, down time. Built-in redundancies require additional space, energy, and resources to implement components that are idle until an error occurs. As yet another example, checkpoint creation can create save points on a model during training, to roll back to in case of a component error that halts training. However, training progress for the model after the latest checkpoint is still lost.

BRIEF SUMMARY

Aspects of the disclosure are directed to executing machine learning models even in the presence of hardware component error of datacenter infrastructure by training machine learning models to handle errors when the models are deployed. Rather than predict or mitigate errors in the hardware of a datacenter or another site deploying the machine learning model, the model is trained to perform a task with comparable accuracy and efficiency even when some hardware on which the model is deployed fails. Instead of deploying recovery processes that may reduce, but not eliminate, downtime on failed devices, component error can instead be simulated during training to cause the machine learning model deployed on the infrastructure to learn to correct errors caused by the component errors. Component error can include total or partial failure of the component.

For example, if the model is trained on a distributed system of devices, and some of the devices experience a form of error, e.g., slow or incomplete transmission of model parameter values computed by those devices, the model can continue to be trained to compensate for periods in which not all parts of the model are available at inference. Updates to the model can be backpropagated to correct errors for handling instances of component error. Other implementations of this aspect include corresponding computer systems, apparatuses, computer-readable storage media, and computer program products recorded on one or more computer storage devices, each configured to perform the actions of the methods.

BRIEF DESCRIPTION OF THE DRAWINGS

FIG. 2 is a flow diagram of an example process for training a machine learning model with infrastructure hardware component error simulation, according to aspects of the disclosure.

FIG. 3 is a flow diagram of an example process of performing a training iteration of training the machine learning model with infrastructure hardware component error simulation, according to aspects of the disclosure.

FIG. 4 is a flow diagram of an example process for simulating errors in hardware components of datacenter infrastructure while training a machine learning model, according to aspects of the disclosure.

DETAILED DESCRIPTION

Overview

Figure 1:
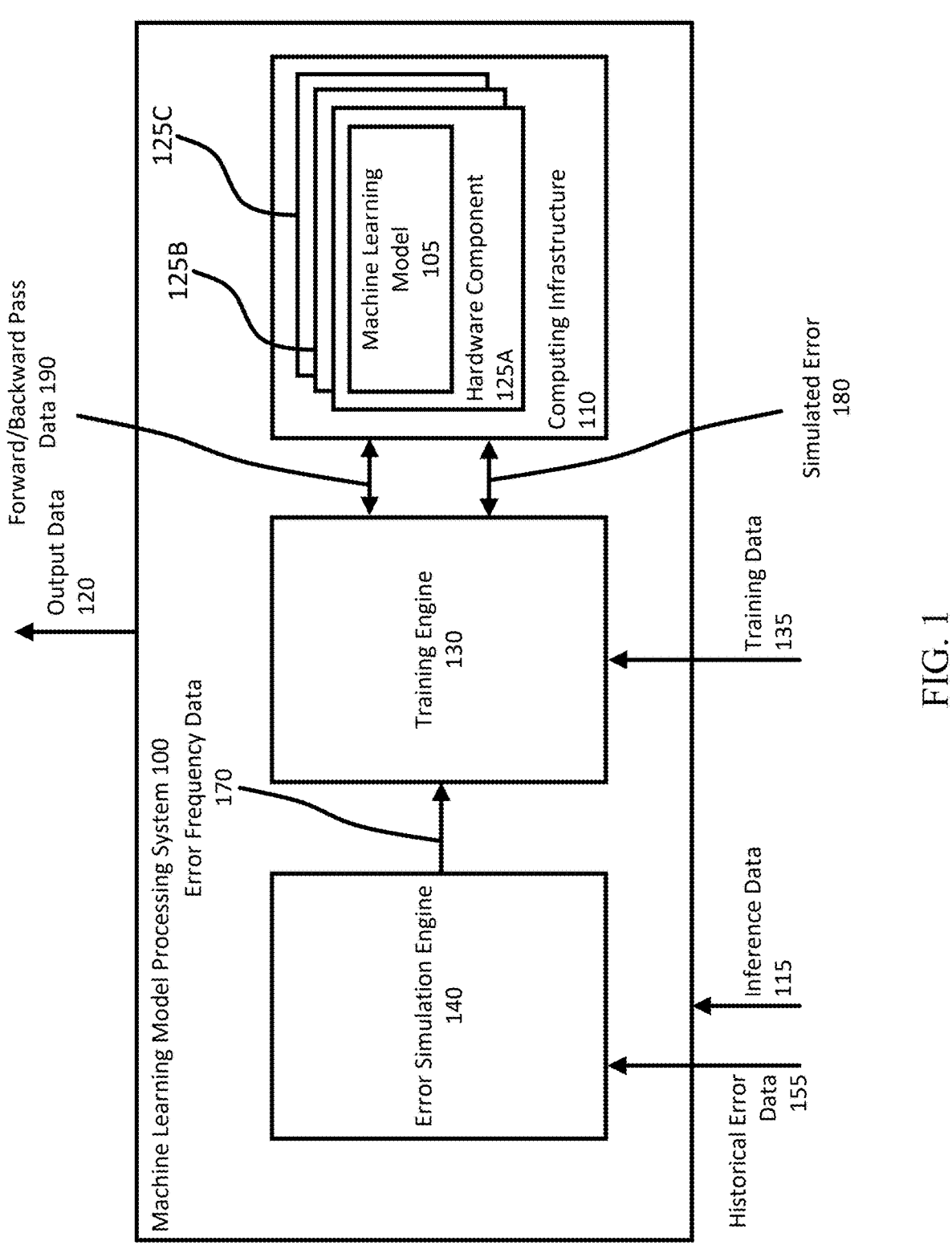
FIG. 1 is a block diagram of an example machine learning model processing system, according to aspects of the disclosure.

Aspects of the disclosure are directed to executing machine learning models despite component errors of datacenter infrastructure by training machine learning models to account for the component errors. Rather than predict or mitigate errors in the hardware of a datacenter or another site deploying the machine learning model, the model is trained to perform a task with comparable accuracy and efficiency even when some hardware on which the model is deployed creates an error, e.g., fails. Components can include hardware components, such as processors, data storage devices, network devices, etc., and/or software components implemented on hardware components, such as computer programs, software applications or scripts, and so on.

Component error can also refer to errors in the computation, which causes the model output to be incorrect or incomplete or causes the model output to generate in excess of a predetermined latency threshold. Component error can also refer to hardware component failure, e.g., a broken device, loss of power to a device, and so on.

Example component errors can include bit flips or other types of data corruption on stored data, for example in memory, CPU registers, or persistent storage devices. Example types of memory in which data corruption can occur include DRAM and SRAM. Data corruption can also occur during transmission of data, e.g., through wires and/or other forms of network communication.

Example component errors can relate to network transmission. Example component errors related to network transmission can include loss of data during network communication, incorrect network routing, incorrect network transmission destinations, and so on. Example component errors can include issues that result in power or thermal issues on a hardware component. Component errors of this type can include wiring issues, thermal issues, and partial or complete power loss. Example component errors can also include mechanical issues and defects, defects in passive components, software bugs, infrastructure management issues, or issues arising from load balancing workloads or priority shifts.

Instead of deploying recovery processes that may reduce, but not eliminate, downtime on failed devices, component error can instead be simulated during training to cause the machine learning model deployed on the infrastructure to learn to correct errors caused by the component errors. For example, if the model is trained on a distributed system of devices, and some of the devices experience a form of error, e.g., slow or incomplete transmission of model parameter values computed by those devices, the model can continue to be trained to compensate for periods in which not all parts of the model are available at inference. Updates to the model can be backpropagated to correct errors for handling instances of component error.

During training, a forward pass of current training data is completed to generate a model output without hardware component error. Hardware component simulation can be performed to inject error into the computing infrastructure training the model. A second forward pass of the current training data with the simulated error is completed to generate a second model output. A loss between the two model outputs with and without the simulated error occurring during the forward pass is computed. During a backward pass, backpropagation is then performed with model parameter updates using the computed loss between the two model outputs. The training and error simulation process can be fine-tuned to simulate error frequencies or different types of error scenarios, e.g., due to hardware error, software component error implemented on components of the datacenter infrastructure, network connectivity issues, and so on.

Errors can be simulated during the training, for example, by simulating the frequency at which some of the components used to train the model fail. Various error frequencies can be determined corresponding to predicted times at which components are likely to fail. Instead of compensating for predicted error with, for example, redundant hardware or recovery processes, the model continues to be executed through the errors. Error frequencies can be predicted or estimated, for example, based on historical error data and durations of errors on the infrastructure executing the model. Machine learning models experience a mean-time-between-failure (MTBF) or mean-time-to-first-failure (MTFF) that falls below the time to recover from error.

A system implemented according to aspects of the disclosure can avoid the need to checkpoint progress of model training or execution, by training the model to generate accurate output even in the presence of hardware or software error. After the model is trained, the system avoids redundant execution of operations as in approaches using checkpointing by outputting results, so long as the accumulated error during execution of the model does not exceed the rate of error simulated during training. A model trained according to aspects of the disclosure can be certified to handle thresholds of error without significantly compromising latency and accuracy. As model size increases, so does the number of components for executing the model. The increase in the number of components and length of training or executing the model also increases the probability of an error occurring. For example, a model can be trained with incrementally higher error frequencies and/or higher percentages of simultaneous component error, until model accuracy degrades past an accepted threshold. Simultaneous component error in this context can include hardware components that do not literally fail at the same wall clock-time, but instead may all fail within the duration of model execution by the system in processing inference data.

Because a model trained according to aspects of the disclosure can proceed to generate output data even in the presence of hardware component error, proactive or reactive techniques for handling error are not necessary. For example, a system executing the model does not need to spend additional processing cycles or memory bandwidth for predicting errors and diverting from hardware ahead of time. Model execution also does not need to be halted or slowed down to allow for redundant hardware components to be swapped in when other components fail.

Using historical error data from a computing infrastructure that is both used to train and execute a machine learning model allows for more accurate simulation of errors that may occur during model execution. Determining worst-case hardware component error allows a model to be trained that handles the worst-case scenario, and not perform excessive training iterations to account for error scenarios that are unlikely to occur for a given computing infrastructure. For example, after training, a model may be shown through training to handle generating outputs even when up to 35% of components fail during execution. In the worst-case scenario, the time to recover from an error exceeds the MTBF for the model. Aspects of the disclosure allow for failed components to be recovered in the background as a result, without slowing down inference or training. This can significantly reduce processing cost and memory usage.

The model can be sharded to use data processing parallelism techniques. In examples in which the model is a foundation model, a large language model, or other types of models too large to be executed on any single device, different components of a datacenter infrastructure are assigned or scheduled to compute different model parameter values as part of generating a model output. Different errors can be simulated based on different types of parallelism employed. For example, in model parallelism, portions of the model are partitioned and processed independently by different devices. To simulate errors in model parallelism, output from some model partitions can be deleted or corrupted before the output is sent to another device for further processing. As another example, in data parallelism, subsets of data are sent to devices implementing the same model or portion of a model. Weight updates from one or more devices can be ignored or corrupted, e.g., due to dumped or corrupted memory, prior to being used to update weights for the model, overall.

Example Systems

FIG. 1 is a block diagram of an example machine learning model processing system 100, according to aspects of the disclosure. The processing system 100 is configured to train machine learning models, such as machine learning model 105, as well as deploy trained machine learning models for processing new inputs. The processing system 100 includes or is in communication with a computing platform or infrastructure, such as computing infrastructure 110. For example, the computing infrastructure 110 can be at least part of a cloud computing platform hosted at one or more datacenters and accessible to different users or organizations. From the computing infrastructure 110, these users or organizations can host and execute online software applications or other services. In some examples, the processing system 100 trains the machine learning model 105 to be deployed or used by other devices, outside of the computing infrastructure 110.

Computing infrastructure 110 can be any collection of hardware components configured to train machine learning models, deploy trained machine learning models, or both. When a machine learning model is deployed on the computing infrastructure 110, the system 100 can receive inference data 115, process the inference data 115 through the machine learning model 105, and generate output data 120. The output data 120 can be sent to the device from which the inference data 115 was received, as an example. In other examples, the output data 120 may be sent to a downstream device that is in communication with the system 100 and configured to perform some operations on the received output data 120.

In FIG. 1, hardware components 125A-125C are shown. The specific number and type of hardware components making up the computing infrastructure 110 can vary from example-to-example. A hardware component can refer to any processing device, memory or storage device, or network device used to communicate data between components of the computing infrastructure 110. As described in more detail with reference to FIG. 6, example hardware components can include various types of hardware accelerators, random-access memories, and networking devices configured to communicate in accordance with one or more different network protocols. The hardware components 125A-125C can include one or more processors, one or more memory devices, and one or more network devices for communicating data among the hardware components of the computing infrastructure 110.

Hardware components 125A-125C can implement one or more software components, such as software applications or scripts, computer program products, and, as described presently, portions of machine learning model 105 for processing the inference data 115 and/or the training data 135. Example software applications include large language model chat agents, generative data software using generative models, and so on. The machine learning model 105 may be downloaded or copied, in some examples, or accessed through an API or other interface, in the same or other examples. Examples of tasks that can be performed by artificial intelligence models, such as the machine learning model 105, follow. Various engines, modules, or systems described herein can be implemented by the hardware components 125A-125C and/or using one or more different computing devices in one or more locations, not shown.

The machine learning model 105 can be any type of machine learning model, such as deep neural networks, support vector machines, decision trees, and so on. For example, the machine learning model 105 may be a foundation model, which can be trained and deployed on the computing infrastructure 110. The machine learning model 105 may be used for a number of applications, such as for classification or generation tasks, based on received input. The input received may be a combination of image, text, video, audio or any other data modality. In some examples, the machine learning model 105 is further fine-tuned, for example with labeled training examples, for performing domain-specific tasks. Other computing devices or systems, such as user computing devices (not shown), can communicate with the computing infrastructure 110 to access the machine learning model 105 for use in various different software applications or services.

Error simulation engine 140 is configured to simulate errors while the machine learning model 105 is being trained. The error simulation engine 140 is also configured to estimate or determine error frequencies for hardware components 125A-125C. For example, the error simulation engine 140 can receive historical error data 155 about hardware component error on the computing infrastructure and use that data to estimate future error frequencies and durations. One metric tracked in the historical error data 155 can include mean-time-between-failure (MTBF) or mean-time-to-first-failure (MTFF).

The error simulation engine 140 can use the MTBF error, for example received or determined from the historical data, to determine an error frequency for a corresponding hardware component over a period of time. The period of time can be the time estimated to train the machine learning model 105. For very large models, e.g., foundation models with trillions of parameters, the period of time can be weeks. The error frequency data determined for various different hardware components determines when and how long to simulate error during the training time.

Historical error data 155 can include logs, reports, or other data collected by the system 100 during operation of the computing infrastructure 110. Historical error data 155 may include data provided by the manufacturer or other sources and that relate to the operation of a hardware component, including known bugs, defects, or edge cases during operation known to cause hardware component error. Historical error data can include frequency and duration information, e.g., how long different types of errors occurred, as well as how long each error lasted. The duration of an error can be the amount of time between when the error started and before the error was resolved.

Examples of historical error data 155 can be data provided by an operator of the computing infrastructure 110, manufacturers of the hardware components implemented as part of the computing infrastructure 110, and/or developers of software applications implemented on the computing infrastructure 110. Data collected from defect state machines, as well as recoverable or unrecoverable errors encountered during deployment of the computing infrastructure 110 may also be sources of historical error data 155. Other examples of historical error data 155 can include defective buffers and databases.

Hardware components of the computing infrastructure 110 can implement performance monitoring units (PMUs) or other components configured to track and store instances of errors that occur during operation of the corresponding hardware component. The error simulation engine 140 can be configured to read or access data collected by these PMUs as part of generating or receiving historical error data 155.

After the historical error data is received or generated, the error simulation engine 140 can generate error frequency data 170 based on the historical error data 155. For example, the error simulation engine 140 can analyze the historical error data 155 according to different statistical indicators, such as the average frequency and/or duration of reported errors for various different hardware components. For example, based on the historical error data 155, the error simulation engine 140 may determine that a particular hardware component fails, on average, once every x hours. The error simulation engine 140 can then cause errors to occur every x hours while the training engine 130 is training the model 105, or when the system 100 is processing inference data 115. The error simulation engine 140 can determine average error times and durations for different types or models of hardware components. In some examples, the error simulation engine 130 can incorporate elements of randomness in error occurrence, e.g., to account for edge cases or non-average instances of error that may occur, for example due to factors external to the computing infrastructure 110, such as power supply issues to a datacenter.

In some examples, the error simulation engine 140 can fit the historical error data to one or more distributions and sample these distributions to determine when to simulate the occurrence of error during model training. Any statistical technique can be applied for fitting a distribution to the historical error data 155, including parametric methods for determining parameter values of the data for fitting to different distributions. Example distributions can include binomial distribution, exponential function, lognormal distribution, Poisson distribution, gamma distribution, or normal distributions. In some examples, the error simulation engine 140 is configured to generate stochastic models for modeling error frequencies based on the historical error data 155. Example stochastic models include Markov chains.

The error simulation engine 140 can generate different distributions based on different types of errors represented in the historical error data 155. For example, network transmission errors may be modeled according to a different distribution than errors caused by corrupted or missing data. During simulation, the error simulation engine 140 can sample from the generated distribution and simulate the type of error corresponding to the sampled distribution.

Error simulation can include simulating at least one of a computation error, a memory error, or a network connectivity error. To simulate a network connectivity error, communications to a hardware component can be temporarily turned off or slowed down, as an example. To simulate memory or computation errors, intermediate data stored by a hardware component can be deleted or corrupted during training.

In some examples, the error simulation engine 140 can be configured to send control signals to various hardware components for triggering behavior simulating the occurrence of a component error. For example, control signals can be sent to throttle power delivery, turn components off or on, or increase the delay between instances of diagnostic or quality control signals. As an example of the latter, a hardware component can include processing units and/or memory interconnected by an interconnect, such as through PCIe. These processing units and/or memory may occasionally send heartbeat signals to indicate that they are still connected and operational, even when idle. As part of simulating error through component failure, the error simulation engine 140 can be configured to change the interval between heartbeat signals, which in turn can cause a device monitoring these signals to raise an exception indicating that the connected component is offline or malfunctioning.

Hardware components may include different validation, error injection, or quality control mechanisms for testing or validating correct operation of the components before deployment. In some examples, the error simulation engine 140 can use these mechanisms for simulating error during model training. To that end, these mechanisms implemented for validation before component deployment can be leveraged after the component deployment, as other techniques for intentionally triggering failures for simulating error when called for by the error frequency data 170. Error injection mechanisms can include general-purpose input/output pins (GPIO), registers, and/or switches for testing or validating hardware through software.

The machine learning model 105 can be sharded across the hardware components 125A-125C for training or executing the model according to a distributed computing approach. A shard of the machine learning model 105 can refer to a portion of model parameter values, hyperparameter values, and/or operations to be performed as part of training or executing the machine learning model 125. How the machine learning model 105 is sharded can vary, for example based on the type of parallelism used to execute or train the model across the hardware components 125A-125C. The system 100 can be configured to schedule and/or partition data or model shards for distributed processing, for example across the hardware components 125A-125C.

Example types of parallelism include model parallelism, data parallelism, and pipeline parallelism. Depending on the type of parallelism(s) implemented as part of training or executing the machine learning model 105, the error simulation engine 140 can generate different types of errors. The system 100 can implement any of various different techniques for parallelizing computation related to model training or execution and is further configured to simulate different errors that may occur in implementing those parallelization techniques.

As one example, if data parallelism is used to train or execute the machine learning model 105, then input data is distributed across multiple hardware components 125A-125C for processing the distributed data in parallel. Intermediate data generated from processing the distributed data in parallel can be aggregated by at least one of the hardware components 125A-125C. Intermediate data can be, for example, layer outputs of the machine learning model such as a neural network, output values for nodes within a layer of the machine learning model, or any data that may be input to an operation performed as part of performing a forward pass of the machine learning model during training or executing the machine learning model once trained.

A simulated error for implemented data parallelism can be missing or incorrect intermediate data resulting in the incorrect aggregation of data. The simulated error in the context of implemented data parallelism can be simulated by the system 100 by at least partially deleting intermediate data deleted from at least one of the hardware components 125A-125C. The specific timing and selection of which hardware component to delete intermediate data from can be based on the error frequency data 170. For example, if the error frequency data 170 indicates that hardware component 125A is due to fail since starting training, then the system 100 can select the hardware component 125A as the next simulated failed device. The selection can be preset at a certain time into training the machine learning model 105, as one example, or set to occur within some interval of a preset time, as another example.

As another example, if model parallelism is used to train or execute the machine learning model 105, then portions of the machine learning model 105 are sharded across the hardware components 125A-125C, each hardware component 125A-125C performing a portion of the overall operations needed for training or executing the model 105. The simulated error in the context of implemented model parallelism can be to at least partially delete or corrupt intermediate data generated from at least one of the hardware components 125A-125C, before the results of each hardware component 125A-125C is aggregated by the system 100.

As another example, if pipeline parallelism is used to train or execute the machine learning model 105, then the machine learning model 105 is divided into stages or layers, with each hardware component 125A-125C assigned to stage or layer. The system 100 divides input data into a batch, each batch processed by a hardware component 125A-125C. The error in the context of implemented pipeline parallelism can be to at least partially delete intermediate data generated from at least one of the hardware components 125A-125C, before the results of each hardware component 125A-125C is aggregated by the system 100.

As another example, implementation-level parallelism can be implemented. Implementation-level parallelism can assign parallelizing operations across hardware components according to specific phases of different model pipelines. For example, large language model (LLM) serving or other transformer-based architectures can involve two distinct phases: prefill and decode. The prefill phase includes generating embeddings, vectors, or other representations of each input token of the machine learning model 105 as an LLM.

The prefill phase can include computing keys, values, or other intermediate data for generating an output token. After computing the keys, values, and outputs for each token, the decode phase can be to autoregressively generate new output tokens from the output token of the prefill phase.

In training or serving an LLM or other transformer-based architecture, some hardware components can be assigned to execute prefill operations, while other components are assigned to execute decode operations. The error in the context of implementation-level parallelism with transformer-based architectures can be simulated, for example by preventing prefill or decode from being completed, such by deleting or causing tokens to go missing in the input during the prefill phase, or tokens in the output during the decode phase.

As another example of implementation-level parallelism, the machine learning model 105 can be a convolutional neural network, with separate hardware components assigned to execute convolutional layers, pooling layers, feed-forward layers, and so on. The error in the context of implementation-level parallelism with convolutional neural networks can be simulated, for example, by causing data between layers to be partially or completely deleted or delayed.

Hardware components 125A-125C can be organized into different groups, e.g., pods, sub-pods, or other collections of components arranged according to a respective network topology. In some examples, error can be simulated for entire groups of hardware components through just the simulation of error of just one hardware component. For example, a group of interconnected hardware accelerators may be assigned to perform a sequence of inter-dependent operations, such that the results of operations performed by each accelerator is needed to output the correct result. If hardware error is simulated for one of the accelerators to temporarily be disabled, then the error is propagated across the entire group, unable to output the correct result of the sequence. In this way, the error simulation engine 140 or other engine causing the error to occur can more efficiently simulate error for larger proportions of the computing infrastructure 110.

Training engine 130 is configured to receive training data 135 for training the machine learning model 105. For example, the training engine 130 can train the machine learning model 105 according to a variety of different learning techniques. Learning techniques for training the machine learning models can include supervised learning, unsupervised learning, semi-supervised learning, and reinforcement learning techniques. For example, training data 135 can include multiple training examples that can be received as input by machine learning model 105. The training examples can be labeled with a desired output for the machine learning model 105 when processing the labeled training examples. The label and the model output can be evaluated through a loss function to determine a loss, which can be backpropagated through the model 105 to update weights for the model. For example, a supervised learning technique can be applied to calculate an error between outputs, with a ground-truth label of a training example processed by the model.

During a training iteration, e.g., during the forward pass, the training engine 130 determines a first model output in accordance with the current model parameter values of the machine learning model 105. The error simulation engine 140 can then simulate an error in accordance with the error frequency data 170. The training engine 130 recomputes the forward pass with the simulated error present in the computing infrastructure 110, to generate a second model output. The training engine 130 then computes a loss between the first and second model outputs, e.g., an L1 loss, an L2 loss, a cross-entropy loss, or using any other suitable loss function. The loss calculated between the first and the second model output is then used by the training engine 130 to perform a backward pass. The training engine 130 uses the computed loss to update model parameter values of the model 105. Updating the model parameter values with this calculated loss causes the model 105 to generate output that is closer to the first model output (without any error), when error does occur during computation.

Multiple training iterations can be performed, e.g., with successive forward and backward passes, and with or without simulated error during training by the error simulation engine 140. In some examples, training can be performed with different values of frequencies and durations indicated in the error frequency data 170, to help identify an upper bound of tolerated error the computing infrastructure 110 can experience while still generating output data 120 that is within an acceptable threshold of accuracy or latency. The thresholds can be predetermined or user-specified and may vary depending on the nature of the task the machine learning model 105 is trained or being trained to perform.

As an example, the error frequency data 170 can specify instances of error of up to different percentages of total hardware components, e.g., 5%, 10%, 15%, 20%, 25%, and so on. At each percentage, the training engine 130 can determine whether the model outputs of the model before and after the simulated error are within a predetermined threshold of accuracy, and/or generated within a predetermined threshold of latency.

The target percentage may be based on the historical errors observed in the computing infrastructure 110. For example, the error simulation engine 140 can determine that at no point has the computing infrastructure 110 ever experienced more than 10% total hardware component error during model execution. Therefore, 10% can be a target error percentage used by the error simulation engine 140 to simulate error across the computing infrastructure 110 during training. After training, the model 105 can be considered "certified" to generate accurate output even in instances of up to 10% of all hardware components failing during processing the inference data 115.

As shown in FIG. 1, forward/backward pass data 190 can be passed back and forth between the training engine 130 and the computing infrastructure 110. The forward/backward pass data 190 can include the outputs from performing a forward pass, either before or after error simulation, as well as the computed losses, gradients, and/or model parameter updates based on the gradients and computed losses. The computed losses can include the loss computed with respect to an overall objective function, as well as a loss computed between outputs before and after simulated error during a training iteration.

Simulated error 180 can include data or control signals sent to the computing infrastructure 110 during training. Although shown as coming from the training engine 130 in receipt of the error frequency data 170, in different examples different components can be responsible for causing simulated errors to occur. For example, the computing infrastructure 110 may receive error frequency data 170 and simulate errors in accordance with the error frequency data 170 as a separate loop or routine from the training iterations performed by the training engine 130.

The machine learning model 105 may be trained as a foundation model, for example a pre-trained transformer model, for performing natural language processing tasks. Other examples of foundation models that may be trained include models for performing generative tasks, such as generating text, computer code, video, audio, or images based on an input prompt, which itself may be at least partially written in natural language.

As another example, the training data 135 and/or the inference data 115 to the machine learning model 105 can be in the form of images, videos. The machine learning model 105 can be trained to extract, identify, and generate features as part of processing a given input, for example as part of a computer vision task. When trained to perform this type of AI task, the machine learning model 105 can generate an output classification from a set of different potential classifications. In addition, or alternatively, the machine learning model 105 can be trained to output a score corresponding to an estimated probability that an identified subject in the image or video belongs to a certain class.

As another example, the training data 135 and/or inference data 115 to the AI model can be data files corresponding to a particular format, e.g., HTML files, word processing documents, or formatted metadata obtained from other types of data, such as metadata for image files. An AI task in this context can be to classify, score, or otherwise predict some characteristic about the received input. For example, the machine learning model 105 can be trained to predict the probability received input includes text relating to a particular subject. Also, as part of performing a particular task, the machine learning model 105 can be trained to generate text predictions, for example as part of a tool for auto-completion of text in a document as the document is being composed. The machine learning model 105 can also be trained for predicting a translation of text in an input document to a target language, for example as a message is being composed.

Other types of input documents in the training data 135 and/or the inference data 115 can relate to characteristics of a network of interconnected devices. These input documents can include activity logs, as well as records concerning access privileges for different computing devices to access different sources of potentially sensitive data. The machine learning model 105 can be trained for processing these and other types of documents for predicting on-going and future security breaches to the network. For example, the machine learning model 105 can be trained to predict intrusion into the network by a malicious actor.

As another example, the training data 135 and/or inference data 115 can be audio input, including streamed audio, pre-recorded audio, and audio as part of a video or other source or media. An AI task in the audio context can include speech recognition, including isolating speech from other identified sources of audio and/or enhancing characteristics of identified speech to be easier to hear. The machine learning model 105 can be trained to predict an accurate translation of input speech to a target language, for example in real-time as part of a translation tool.

In addition to data input, including the various types of data described herein, the machine learning model 105 can also be trained to process features corresponding to given input. Features are values, e.g., numerical or categorical, which relate to some characteristic of the input. For example, in the context of an image, a feature of the image can relate to the RGB value for each pixel in the image. An AI task in the image/video context can be to classify contents of an image or video, for example for the presence of different people, places, or things. AI models can be trained to extract and select relevant features for processing to generate an output for a given input and can also be trained to generate new features based on learned relationships between various characteristics of input data.

Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met.

The model can be modified or updated until stopping criteria are met, such as a number of iterations for training, a maximum period of time, a convergence of estimated rewards or value between actions, or when a minimum value threshold is met. A model can be a composite of multiple models or components of a processing or training pipeline. In some examples, the models or components are trained separately, while in other examples, the models or components are trained end-to-end.

One iteration of training can include receiving the training data 135, processing the training data using the machine learning model 105 to generate model outputs, determining a total error of the model outputs in accordance with an objective function, and updating parameter values for the machine learning model using the total error. The training iteration may be referred to as an epoch. The processing system 100 is configured to receive validation data or testing data in addition to receiving the training data 135. In some examples, the processing system 100 receives and splits data into training data, validation data, and testing data, e.g., according to an 80/10/10 split. The length of a training iteration can vary from example-to-example, e.g., minutes, hours, or days. Errors may be simulated across one or more training iterations, including successive iterations.

In some examples, the system 100 can implement redundant hardware components (not shown) to act as back-up or replacements to hardware components 125A-125C that may fail over time. Notably, these replacement hardware components do not impact any model execution that may be occurring when a hardware component fails. The system 100 continues to process the inference data 115 to generate output data 120, without needing to wait for the replacement hardware components to come online. Further, the system 100 also does not require checkpointing progress of the model execution to account for data lost during error of one or more hardware components 125A-125C. Instead, the replacement hardware components may be brought online as a background process or after the output data 120 is generated.

Example Methods

FIG. 2 is a flow diagram of an example process 200 for training a machine learning model with infrastructure component error simulation, according to aspects of the disclosure. The example process can be performed on a system of one or more processors in one or more locations, such as the machine learning model processing system of FIG. 1. While the operations of methods and processes are described herein in a particular order, it should be understood that the order of operations may be modified. Moreover, operations may be added or omitted.

The system receives error frequency data, according to block 210. The error frequency data includes a frequency and duration for component error of a plurality of hardware components of a computing infrastructure, according to block 210. The system includes a plurality of hardware components, for example as described with reference to FIGS. 1 and 6. At least some of the hardware components can be configured for performing operations as part of training or executing a machine learning model. One or more hardware components of the plurality of hardware components can implement one or more software components.

The same or other hardware components can be configured to perform other operations, e.g., receiving the error frequency data 170, scheduling the machine learning model for training, sharding the machine learning model across the plurality of hardware components, and so on. In some examples and as described with reference to FIG. 3, at least some of the hardware components can be configured to receive historical error data, generate frequency error data from the historical error data, and/or cause the plurality of hardware components to simulate various types of errors in accordance with the generated frequency error data. In some examples, one or more hardware components of the plurality of hardware components implement one or more software components, and error of the one or more hardware components includes error of the one or more software components.

The system can simulate the error that occurs during the training of the machine learning model. In some examples, simulating the error of the one or more hardware components includes causing the one or more hardware components to be unresponsive during the training of the machine learning model. In some examples, simulating the error of the one or more hardware components includes causing the one or more hardware components to lose intermediate data generated during the training of the machine learning model. In some examples, simulating the error includes simulating at least one of a memory error, a data transmission error, a computation error, or a network connectivity error at the one or more hardware components during the one or more training iterations.

The system trains a machine learning model over one or more training iterations to generate a trained machine learning model, according to block 220. In training the machine learning model over one or more training iterations, error of the one or more hardware components is simulated in accordance with the error frequency data. For example, the system can simulate errors at certain frequencies and durations during training, as indicated in the error frequency data. The system can be configured to simulate various types of errors, which may originate, for example, from a hardware component or in the data connection formed between two or more hardware components. As described with reference to FIG. 1, types of errors that are simulated can be based on failures or erroneous data communication between devices configured to perform some type of distributed computation, for example based on data, model, and/or pipeline parallelism. An example training iteration is shown and described with reference to FIG. 3.

The system outputs the trained machine learning model, according to block 230. The trained machine learning model can be deployed on the same or similar hardware components as the hardware components used to train the machine learning model. Similar hardware components can include hardware components that follow the same error frequencies as the error frequency data used to simulate errors during training. After the model is deployed, the model can be executed on new input. If error occurs during execution of the model, the model output can still meet accuracy or latency requirements, because of the model training to account for errors during training. As described with reference to FIG. 1, the training engine 130 can be configured to identify a percentage of tolerated simultaneous error, such that the system generates output within accuracy and latency thresholds even when up to the tolerated percentage of errors occurs across hardware components during model execution.

FIG. 3 is a flow diagram of an example process 300 of performing a training iteration of training the machine learning model with infrastructure hardware component error simulation, according to aspects of the disclosure.

The system determines a first model output before simulating error and a second model output after simulating error, according to block 310. The system can simulate errors, for example, as described herein with reference to FIG. 1. The system can simulate the error between generating the first model output and the second model output. Error simulation can vary depending on the types of hardware components of the system, as well as the type of parallelism used during training. The first model output is generated before the system simulates one or more errors of one or more hardware components. The second model output is generated after the system simulates the one or more errors.

The system calculates a loss between the first model output and the second model output, according to block 320. As described with reference to FIG. 1, the loss function used by the system to calculate the loss between the first and second model output can be any suitable loss function, e.g., L1 loss, L2 loss, cross-entropy loss, and so on.

The system updates one or more model parameter values of the machine learning model in accordance with the calculated loss, according to block 330. For example, the system can be configured to perform backpropagation with gradient descent and model parameter value update. When the model is executed, the updated model parameter values can cause the model to generate output that is closer in value to the first model output (without error) even when hardware component error occurs. This training approach allows the model to generalize to generating outputs, with and without error in the computing infrastructure on which the model is executed.

The processes 200 and 300 as shown with respect to FIGS. 2 and 3, respectively, can be repeated multiple times with error frequency data specifying different durations and frequencies of error of the computing infrastructure training the machine learning model. As described with reference to FIG. 1, the error frequency data can be changed after one or more training iterations to cause the error simulation engine 140 to simulate errors more frequently and for longer periods of time. The training engine 130 can check whether model output with and without simulated error stays within a predetermined threshold of each other, to determine an upper threshold of error that the model can tolerate during execution. In practice, the model can be trained to tolerate whatever an upper bound may be of expected simultaneous error on a computing infrastructure.

FIG. 4 is a flow diagram of an example process 400 for simulating errors in hardware components of datacenter infrastructure while training a machine learning model, according to aspects of the disclosure.

The system receives historical error data for a computing infrastructure including a plurality of hardware components for training or executing a machine learning model, according to block 410. The historical error data can include a mean-time-between-failure (MTBF) and/or mean-time-to-first-failure (MTFF) for at least one hardware component of the plurality of hardware components. As described with reference to FIG. 1, the historical error data can be collected by the system or another component, and may include logs, reports, or metadata collected as part of monitoring or tracking the performance of various different hardware components of a computing infrastructure.

The system generates error frequency data based on the historical error data, according to block 420. As described herein, for example with reference to FIG. 1, the system can determine average durations and frequencies of hardware component error based on the historical error data. The system can use the average durations and frequencies to determine when and how long to simulate error during training. The error frequency data can then be used, for example by an error simulation engine, to simulate error during training of a machine learning model.

Example Computing Environment

Figure 5:
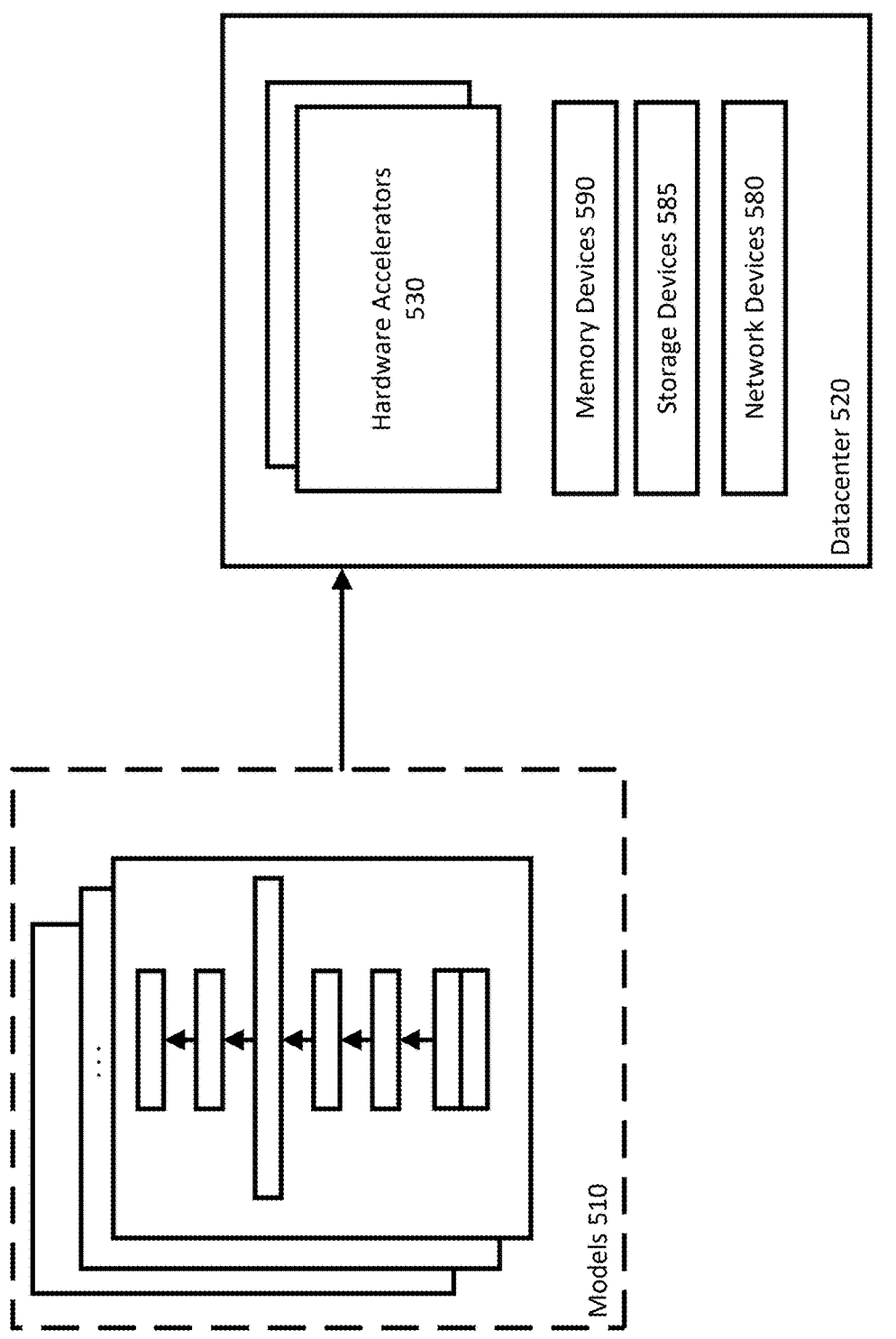
FIG. 5 is a block diagram illustrating one or more models, such as for deployment in a datacenter housing a hardware accelerator on which the models can be trained with error simulation in hardware components of datacenter infrastructure, according to aspects of the disclosure.

FIG. 5 is a block diagram illustrating one or more models 510, such as for deployment in a datacenter housing a hardware accelerator 530 on which the models can be trained with error simulation in hardware components of datacenter infrastructure, according to aspects of the disclosure. An architecture of a model can refer to characteristics defining the model, such as characteristics of layers for the model, how the layers process input, or how the layers interact with one another. For example, the model can be a convolutional neural network that includes a convolution layer that receives input data, followed by a pooling layer, followed by a fully connected layer that generates a result. The architecture of the model can also define types of operations performed within each layer. For example, the architecture of a convolutional neural network may define that rectified linear unit (ReLU) activation functions are used in the fully connected layer of the network. Other example architectures can include generative models, such as language models, foundation models, and/or graphical models. One or more model architectures can be generated that can be trained by the processing system 100, in accordance with aspects of the disclosure.

Datacenter 520 can include hardware components, such as hardware accelerators 530. The hardware accelerators 530 can be any type of processor, such as a central processing unit (CPU), graphics processing unit (GPU), field-programmable gate array (FPGA), data processing unit (DPU), infrastructure processing unit (IPU), or an application-specific integrated circuit (ASIC), such as a tensor processing unit (TPU). The hardware accelerators 530, as well as memory devices 590, storage devices 585, and/or network devices 580, described with reference to FIG. 6, are examples of hardware components used in a computing infrastructure, such as hardware components 125A-125C and computing infrastructure 110 of FIG. 1.

Figure 6:
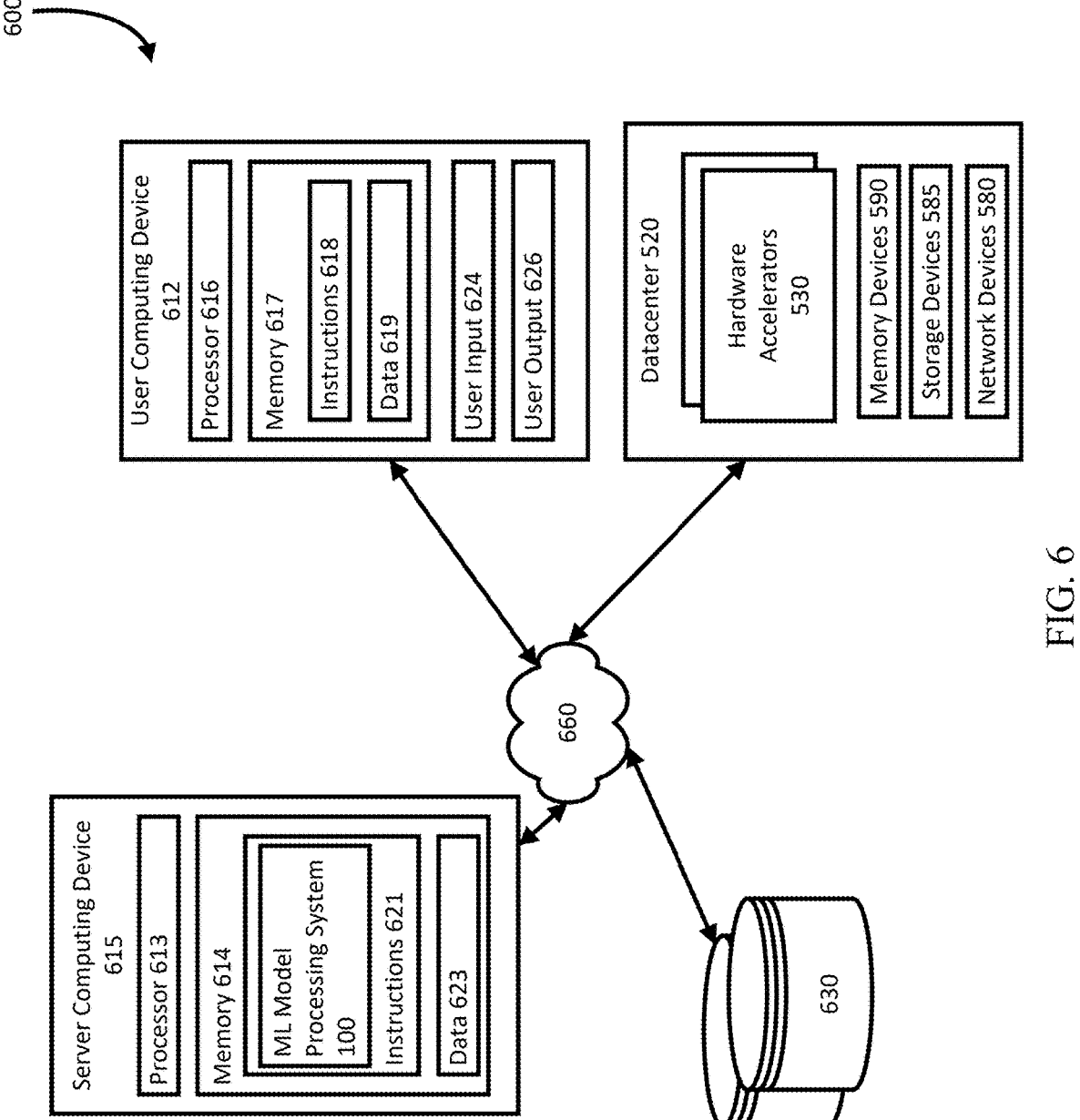
FIG. 6 is a block diagram of an example computing environment for implementing the system of FIG. 1.

FIG. 6 is a block diagram of an example computing environment 600 for implementing the machine learning model processing system 100. The processing system 100 can be implemented on one or more devices having one or more processors in one or more locations, such as in server computing device 615. User computing device 612 and the server computing device 615 can be communicatively coupled to one or more storage devices 630 over a network 660. The storage device(s) 630 can be a combination of volatile and non-volatile memory and can be at the same or different physical locations than the computing devices 612, 615. For example, the storage device(s) 630 can include any type of non-transitory computer readable medium capable of storing information, such as a hard-drive, solid state drive, tape drive, optical storage, memory card, ROM, RAM, DVD, CD-ROM, write-capable, and read-only memories.

Aspects of the disclosure can be implemented in a computing system that includes a back-end component, e.g., as a data server, a middleware component, e.g., an application server, or a front-end component, e.g., user computing device 612 having a user interface, a web browser, or an app, or any combination thereof. The components of the system can be interconnected by any form or medium of digital data communication, such as a communication network. Examples of communication networks include a data center network (DCN), a local area network (LAN) and/or a wide area network (WAN), e.g., the Internet. The datacenter 520 can also be in communication with the user computing device 612 and the server computing device 615.

The computing system can include clients, e.g., user computing device 612 and servers, e.g., server computing device 615. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Other examples include transmitting data using remote procedure calls (RPCs) and/or frameworks based on RPCs, and REST API calls. Data generated at the client device, e.g., a result of the user interaction, can be received at the server from the client device.

The server computing device 615 can include one or more processors 613 and memory 614. The memory 614 can store information accessible by the processor(s) 613, including instructions 621 that can be executed by the processor(s) 613. The memory 614 can also include data 623 that can be retrieved, manipulated, or stored by the processor(s) 613. The memory 614 can be a type of non-transitory computer readable medium capable of storing information accessible by the processor(s) 613, such as volatile and non-volatile memory. The processor(s) 613 can include one or more central processing units (CPUs), graphic processing units (GPUs), field-programmable gate arrays (FPGAs), and/or application-specific integrated circuits (ASICs), such as tensor processing units (TPUs).

The instructions 621 can include one or more instructions that when executed by the processor(s) 613, causes the one or more processors to perform actions defined by the instructions. The instructions 621 can be stored in object code format for direct processing by the processor(s) 613, or in other formats including interpretable scripts or collections of independent source code modules that are interpreted on demand or compiled in advance. The instructions 621 can include instructions for implementing the processing system 100 consistent with aspects of this disclosure. The system 100 can be executed using the processor(s) 613, and/or using other processors remotely located from the server computing device 615.

The data 623 can be retrieved, stored, or modified by the processor(s) 613 in accordance with the instructions 621. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII, or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured similarly to the server computing device 615, with one or more processors 616, memory 617, instructions 618, and data 619. For example, the user computing device 612 can be a mobile device, a laptop, a desktop computer, a game console, etc. The user computing device 612 can also include a user output 626, and a user input 624. The user input 624 can include any appropriate mechanism or technique for receiving input from a user, including acoustic input; visual input; tactile input, including touch motion or gestures, or kinetic motion or gestures or orientation motion or gestures; auditory input, speech input, etc., Example devices for user input 624 can include a keyboard, mouse or other point device, mechanical actuators, soft actuators, touchscreens, microphones, and sensors.

The server computing device 615 can be configured to transmit data to the user computing device 612, and the user computing device 612 can be configured to display at least a portion of the received data on a display implemented as part of the user output 626. The user output 626 can also be used for displaying an interface between the user computing device 612 and the server computing device 615. The user output 626 can alternatively or additionally include one or more speakers, transducers or other audio outputs, a haptic interface or other tactile feedback that provides non-visual and non-audible information to the platform user of the user computing device 612.

Although FIG. 6 illustrates the processors 613, 616 and the memories 614, 617 as being within the computing devices 615, 612, components described in this specification, including the processors 613, 616 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 616. Similarly, the processors 613, 616 can include a collection of processors that can perform concurrent and/or sequential operation. The computing devices 615, 612 can each include one or more internal clocks providing timing information, which can be used for time measurement for operations and programs run by the computing devices 615, 612.

The server computing device 615 can be configured to receive requests to process data from the user computing device 612. For example, the environment 600 can be part of a computing platform configured to provide a variety of services to users, through various user interfaces and/or APIs exposing the platform services. One or more services can be a machine learning framework or a set of tools for training or executing generative AI models, foundation models, or other machine learning models according to a specified task and training data.

The devices 612, 615 can be capable of direct and indirect communication over the network 660. The devices 615, 612 can set up listening sockets that may accept an initiating connection for sending and receiving information. The network 660 itself can include various configurations and protocols including the Internet, World Wide Web, intranets, virtual private networks, wide area networks, local networks, and private networks using communication protocols proprietary to one or more companies. The network 660 can support a variety of short- and long-range connections. The short- and long-range connections may be made over different bandwidths, such as 2.402 GHz to 2.480 GHZ (commonly associated with the Bluetooth® standard), 2.4 GHz and 5 GHZ (commonly associated with the Wi-Fi® communication protocol); or with a variety of communication standards, such as the LTE® standard for wireless broadband communication. The network 660, in addition or alternatively, can also support wired connections between the devices 612, 615, including over various types of Ethernet connection.

Although a single server computing device 615, user computing device 612, and datacenter 520 are shown in FIG. 6, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Methods, systems, and apparatus, including computer-readable storage media for handling component error of datacenter infrastructure by training machine learning models to handle errors when the models are deployed. Rather than predict or mitigate errors in the hardware of a datacenter or another site deploying the machine learning model, the model is trained to perform a task with comparable accuracy and efficiency even when some hardware on which the model is deployed fails. Component error can instead be simulated during training to cause the machine learning model deployed on the infrastructure to learn to correct errors caused by the component errors. The model can continue to be trained to compensate for periods in which not all parts of the model are available at inference. Updates to the model can be backpropagated to correct errors for handling instances of component error.

Implementations of the present technology can each include, but are not limited to, the following. The features may be alone or in combination with one or more other features described herein. In some examples, the following features are included in combination:

(1) A system including a plurality of hardware components configured to train machine learning models, and further configured to: receive error frequency data including a frequency and duration for component error of the plurality of hardware components; train a machine learning model over one or more training iterations to generate a trained machine learning model, wherein, during one or more of the training iterations, error of one or more hardware components of the plurality of hardware components is simulated in accordance with the error frequency data; and output the trained machine learning model.

(2) The system of (1), wherein error of the one or more hardware components includes error of one or more software components implemented by the one or more hardware components.

(3) The system of either one of (1) or (2), wherein in training the machine learning model, the plurality of hardware components are configured to: determine a first model output before simulating error of the one or more hardware components and a second model output after simulating error of the one or more hardware components, calculate a loss between the first model output and the second model output, and update one or more model parameter values of the machine learning model in accordance with the loss.

(4) The system of (3), wherein the plurality of hardware components is further configured to simulate the error of the one or more hardware components the plurality of hardware components, including causing the one or more hardware components to be unresponsive during the training of the machine learning model.

(5) The system of (4), wherein in simulating the error of the one or more hardware components, the plurality of hardware components is configured to cause the one or more hardware components to lose intermediate data generated during the training of the machine learning model.

(6) The system of either one of (4) or (5), wherein in simulating the error of the one or more hardware components, the plurality of hardware components is configured to simulate at least one of a memory error, a data transmission error, a computation error, or a network connectivity error at the one or more hardware components during the one or more training iterations.

(7) The system of any one of (1) through (6), wherein in receiving the error frequency data, the plurality of hardware components is further configured to: receive historical error data of the plurality of hardware components; and generate the error frequency data based on the historical error data.

(8) The system of (7), wherein the historical error data includes a mean-time-between-failure (MTBF) and/or mean-time-to-first-failure (MTFF) for at least one hardware component of the plurality of hardware components.

(9) The system of any one of (1) through (8), wherein the machine learning model is a foundation model.

(10) The system of any one of (1) through (9), wherein the hardware components include one or more processors, one or more memory devices, and one or more network devices for communicating data among hardware components of the plurality of hardware components.

(11) The system of any one of (1) through (10), wherein training the machine learning model includes: implementing one or more of model, data, or pipeline parallelism; and simulating, by the plurality of hardware components, error based on the implemented one or more parallelisms.

(12) A method for training a machine learning model, including: receiving, by a plurality of hardware components of a computing infrastructure configured to train machine learning models, error frequency data including a frequency and duration for component error of the plurality of hardware components; training, by the plurality of hardware components, a machine learning model over one or more training iterations to generate a trained machine learning model, wherein, during at least one of the one or more the training iterations, error of one or more hardware components of the plurality of hardware components is simulated in accordance with the error frequency data; and outputting, by the plurality of hardware components, the trained machine learning model.

(13) The method of (12), wherein error of the one or more hardware components includes error of one or more software components implemented by the one or more hardware components.

(14) The method of either one of (12) or (13), wherein training the machine learning model includes: determining, by the plurality of hardware components, a first model output before simulating error of the one or more hardware components and a second model output after simulating error of the one or more hardware components, calculating, by the plurality of hardware components, a loss between the first model output and the second model output, and updating, by the plurality of hardware components, one or more model parameter values of the machine learning model in accordance with the loss.

(15) The method of any one of (12) through (14), further including simulating the error of the one or more hardware components by causing the one or more hardware components to be unresponsive during the training of the machine learning model.

(16) The method of any one of (12) through (15), wherein simulating the error of the one or more hardware components includes causing the one or more hardware components to lose intermediate data generated during the training of the machine learning model.

(17) The method of any one of (12) through (16), wherein simulating the error of the one or more hardware components includes simulating at least one of a memory error, a data transmission error, a computation error, or a network connectivity error at the one or more hardware components during the one or more training iterations.

(18) The method of (12) through (17), wherein receiving the error frequency data includes: receiving historical error data of the plurality of hardware components; and generating, by the plurality of hardware components, the error frequency data based on the historical error data.

(19) The method of (18), wherein the historical error data includes a mean-time-between-failure (MTBF) for at least one hardware component of the plurality of hardware components.

(20) The method of either (18) or (19), wherein the machine learning model is a foundation model.

(21) The method of any one of (12) through (20), wherein the hardware components include one or more processors, one or more memory devices, and one or more network devices for communicating data among hardware components of the plurality of hardware components.

(22) The method of any one of (12) through (20), wherein training the machine learning model includes: implementing one or more of model, data, or pipeline parallelism; and simulating, by the plurality of hardware components, error based on the implemented one or more parallelisms.

(23) One or more computer-readable storage media storing instructions that when performed by a plurality of hardware components of a computing infrastructure, causes the plurality of hardware components to perform operations including: receiving, by the plurality of hardware components of a computing infrastructure configured to train machine learning models, error frequency data including a frequency and duration for component error of the plurality of hardware components; training, by the plurality of hardware components, a machine learning model over one or more training iterations to generate a trained machine learning model, wherein, during at least one of the one or more the training iterations, error of one or more hardware components of the plurality of hardware components is simulated in accordance with the error frequency data; and outputting, by the plurality of hardware components, the trained machine learning model.

(24) The one or more computer-readable storage media of (23), wherein the one or more computer-readable storage media is non-transitory.

(25) The computer-readable storage media of either one of (24) or (25), wherein the operations further include performing the method of any one of (12) through (22).

(26) A computer program product storing instructions that when performed by a plurality of hardware components of a computing infrastructure, causes the plurality of hardware components to perform operations including: receiving, by the plurality of hardware components of a computing infrastructure configured to train machine learning models, error frequency data including a frequency and duration for component error of the plurality of hardware components; training, by the plurality of hardware components, a machine learning model over one or more training iterations to generate a trained machine learning model, wherein, during at least one of the one or more the training iterations, error of one or more hardware components of the plurality of hardware components is simulated in accordance with the error frequency data; and outputting, by the plurality of hardware components, the trained machine learning model.

(27) The computer program product of (26), wherein the operations further include performing the method of any one of (12) through (22).

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more engines or modules of computer program instructions encoded on one or more tangible non-transitory computer storage media for execution by, or to control the operation of, one or more data processing apparatus.

A computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, which is generated to encode information for transmission to suitable receiver apparatus for execution by a data processing apparatus. A computer program may, but need not, correspond to a file in a file system. A computer program can be stored in a portion of a file that holds other programs or data, e.g., one or more scripts, in a single file, or in multiple coordinated files, e.g., files that store one or more engines, modules, sub-programs, or portions of code.

The term "configured" is used herein in connection with systems and computer program components. For a system of one or more computers to be configured to perform particular operations or actions means that the system has installed software, firmware, hardware, or a combination thereof that cause the system to perform the operations or actions. For one or more computer programs to be configured to perform operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC), such as a Tensor Processing Unit (TPU). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks, such as static or dynamic computational graph frameworks.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "engine" can refer to a software-based system, subsystem, or process that is programmed to perform one or more specific functions. The engine can be implemented as one or more software modules or components or can be installed on one or more computers in one or more locations. A particular engine can have one or more processors or computing devices dedicated thereto, or multiple engines can be installed and running on the same processor or computing device. In some examples, an engine can be implemented as a specially configured circuit, while in other examples, an engine can be implemented in a combination of software and hardware.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers. While operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the examples described above should not be understood as requiring such separation in all examples, and it should be understood that the described program components and systems can be integrated together in one or more software or hardware-based devices or computer-readable media.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a desktop computer, a personal digital assistant (PDA), a mobile audio or video player, a game console, a tablet, a virtual-reality (VR) or augmented-reality (AR) device, a Global Positioning System (GPS), or a portable storage device, e.g., a universal serial bus (USB) flash drive, as examples. Examples of the computer or special purpose logic circuitry can include the user computing device 612, the server computing device 615, or the hardware accelerators 530.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

The invention claimed is:

1. A method for training a machine learning model, comprising:
  receiving, by a plurality of hardware components of a computing infrastructure configured to train machine learning models, error frequency data comprising a frequency and duration for component error of the plurality of hardware components;
  training, by the plurality of hardware components, a machine learning model over one or more training iterations to generate a trained machine learning model, wherein, during at least one of the one or more the training iterations, error of one or more hardware components of the plurality of hardware components is simulated in accordance with the error frequency data; and
  outputting, by the plurality of hardware components, the trained machine learning model.

24

2. The method of claim 1, wherein error of the one or more hardware components comprises error of one or more software components implemented by the one or more hardware components.

3. The method of claim 1, wherein training the machine learning model comprises:
  determining, by the plurality of hardware components, a first model output before simulating error of the one or more hardware components and a second model output after simulating error of the one or more hardware components,
  calculating, by the plurality of hardware components, a loss between the first model output and the second model output, and
  updating, by the plurality of hardware components, one or more model parameter values of the machine learning model in accordance with the loss.

4. The method of claim 1, further comprising simulating the error of the one or more hardware components by causing the one or more hardware components to be unresponsive during the training of the machine learning model.

5. The method of claim 1, wherein simulating the error of the one or more hardware components comprises causing the one or more hardware components to lose intermediate data generated during the training of the machine learning model.

6. The method of claim 1, wherein simulating the error of the one or more hardware components comprises simulating at least one of a memory error, a data transmission error, a computation error, or a network connectivity error at the one or more hardware components during the one or more training iterations.

7. The method of claim 1, wherein receiving the error frequency data comprises:
  receiving historical error data of the plurality of hardware components; and
  generating, by the plurality of hardware components, the error frequency data based on the historical error data.

8. The method of claim 7, wherein the historical error data comprises a mean-time-between-failure (MTBF) or mean-time-to-first-failure (MTFF) for at least one hardware component of the plurality of hardware components.

9. The method of claim 1, wherein the machine learning model is a foundation model.

10. The method of claim 1, wherein the hardware components comprise one or more processors, one or more memory devices, and one or more network devices for communicating data among hardware components of the plurality of hardware components.

11. The method of claim 1, wherein training the machine learning model comprises:
  implementing one or more of model, data, or pipeline parallelism; and
  simulating, by the plurality of hardware components, error based on the implemented one or more parallelisms.

12. A system comprising:
  a plurality of hardware components configured to train machine learning models, and further configured to:
    receive error frequency data comprising a frequency and duration for component error of the plurality of hardware components;
    train a machine learning model over one or more training iterations to generate a trained machine learning model, wherein, during one or more of the training iterations, error of one or more hardware components of the plurality of hardware components is simulated in accordance with the error frequency data; and output the trained machine learning model.

13. The system of claim 12, wherein error of the one or more hardware components comprises error of one or more software components implemented by the one or more hardware components.

14. The system of claim 12, wherein in training the machine learning model, the plurality of hardware components are configured to:

determine a first model output before simulating error of the one or more hardware components and a second model output after simulating error of the one or more hardware components, calculate a loss between the first model output and the second model output, and update one or more model parameter values of the machine learning model in accordance with the loss.

15. The system of claim 14, wherein the plurality of hardware components is further configured to simulate the error of the one or more hardware components the plurality of hardware components, comprising causing the one or more hardware components to be unresponsive during the training of the machine learning model.

16. The system of claim 15, wherein in simulating the error of the one or more hardware components, the plurality of hardware components is configured to cause the one or more hardware components to lose intermediate data generated during the training of the machine learning model.

17. The system of claim 15, wherein in simulating the error of the one or more hardware components, the plurality of hardware components is configured to simulate at least one of a memory error, a data transmission error, a computation error, or a network connectivity error at the one or more hardware components during the one or more training iterations.

18. The system of claim 12, wherein in receiving the error frequency data, the plurality of hardware components is further configured to:

receive historical error data of the plurality of hardware components; and generate the error frequency data based on the historical error data.

19. The system of claim 18, wherein the historical error data comprises a mean-time-to-error (MTBF) for at least one hardware component of the plurality of hardware components.

20. One or more non-transitory computer-readable storage media storing instructions that when performed by a plurality of hardware components of a computing infrastructure, causes the plurality of hardware components to perform operations comprising:

receiving error frequency data comprising a frequency and duration for component error of the plurality of hardware components;

training a machine learning model over one or more training iterations to generate a trained machine learning model, wherein, during one or more of the training iterations, error of one or more hardware components of the plurality of hardware components is simulated in accordance with the error frequency data; and outputting the trained machine learning model.

* * * * *